Aug. 10, 1965     MASARU OTOMO     3,199,638
VARIABLE VOLUME PISTON CHAMBER IN A SHOCK ABSORBER
Filed Dec. 20, 1963

INVENTOR.
MASARU OTOMO
BY
Mason, Fenwick & Lawrence
ATTORNEYS

# United States Patent Office 3,199,638
Patented Aug. 10, 1965

3,199,638
VARIABLE VOLUME PISTON CHAMBER IN A SHOCK ABSORBER
Masaru Otomo, Urawa-shi, Saitama-ken, Japan, assignor to Kayaba Industry Co., Ltd., Tokyo, Japan, a corporation of Japan
Filed Dec. 20, 1963, Ser. No. 332,142
Claims priority, application Japan, Sept. 16, 1963, 38/49,096
2 Claims. (Cl. 188—100)

The magnitude of a damping force of a shock absorber employed in combination with a suspension system of a vehicle is determined by the amount of opening of the main valve on which is exerted a spring force and the quantity of oil flowing through the main valve. An ordinary shock absorber is designed so that its damping force increases or decreases according to the velocity of the piston movement. If the vehicle is transmitted vibration of relatively low frequency, the shock absorber will provide an efficient control of vibration. The shock absorber operates exactly to produce high resistance against high frequency vibration occurring when the vehicle is operated on a continuously undulated or rough road, and transmit the vibration to the spring weight. Hitherto this has caused the shock absorber to result in discomfort to the car user.

This invention relates to an improvement in a shock absorber, whereby it is intended to overcome the above mentioned disadvantages, to produce an effective damping force against the low frequency vibration, and to realize a lesser damping force against the high frequency vibration. It is characterized that a freely movable piston is fitted between the main valve and the piston nut, said main valve being provided on the under face with a leaf valve that closes the oil passage in a damping force producing mechanism or piston, the leaf valve being provided with a restricted fluid passageway, thus forming a phase lag circuit communicating the upper face of the freely movable free piston to the fluid chamber on the upper part of the piston, and thereby forming an upper compression chamber and a lower compression chamber on the upper and lower faces respectively of said leaf valve.

The drawings show one example of the embodiment of this invention.

Figure 1:
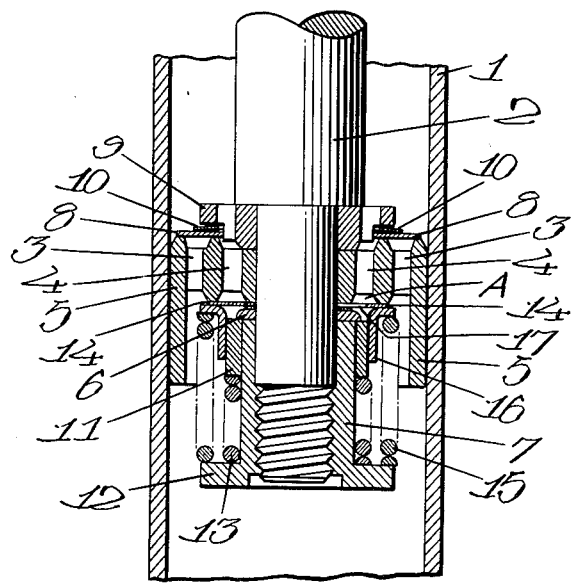
Figure 2:
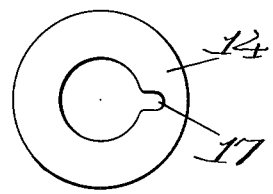

FIG. 1 is a vertical cross section.
FIG. 2 is a plan view of the sub-leaf valve.

Briefly described, the present invention provides a shock absorber generally comprising a housing means containing a fluid, a piston rod mounted in the housing means for movement therein, a piston head mounted on the piston rod within the housing means, the piston head being disposed in sealing relation with the housing means to provide upper and lower fluid chambers, the piston head having a first fluid passageway communicable with the upper and lower chambers, a check valve mounted on the piston head operable to permit fluid flow through the first fluid passageway when the piston head is moving in a first direction, a second fluid passageway communicable with the upper and lower chambers, a valve member disposed on the piston head operable to permit fluid flow through the second passageway when the piston head is moving in a direction opposite from the first direction, yieldable means for urging the second mentioned valve member in a closed position, the piston head having a variable volume chamber and the second mentioned valve member having a restricted passageway permitting communication between the second fluid passageway and the variable volume chamber.

Referring to the drawings, there is illustrated an embodiment of the invention. Specifically, there is provided a cylindrical housing member 1 having a piston rod 2 mounted for axial movement therein. Mounted on the piston rod is a piston head 5, which is secured against a shoulder provided by a reduced end portion of the piston rod by means of a lock nut 7, having a retainer ring 6 interposed therebetween. The piston head 5 is provided with fluid passageways 3 and 4 communicating with upper and lower chambers in the housing member. The piston head 5 is provided with a check valve 8 on the upper side thereof, which obstructs the flow of fluid through fluid passageway 3. The check valve 8 is biased in the closed position by means of a spring member 10, which bears against an annular member 9 mounted on the reduced end portion of the piston rod. On the lower end of the piston head 5 there is provided an annular leaf valve 14 having its inner circumferential end mounted on the reduced lower portion of the piston rod and secured in position between the piston head 5 and the retainer ring 6. The valve 14 also is provided with a movable annular member 16, which is engageable with the lower side of the valve member 14. The annular member 16 is urged into engagement with the valve member 14, by means of a spring member 15 interposed between the member 16 and a flange portion 12 of the lock nut.

Mounted on the lock nut 7 is an axially movable piston member 11, which is engageable with the retainer ring 6. The piston member 11 is urged into engagement with the retainer ring 6, by means of a spring member 13 interposed between the piston member 11 and the flange portion 12 of the lock nut. The upper end of the piston member 11 is received within that portion of fluid passageway 4 below the leaf valve member 14 to provide a variable volume chamber. The leaf valve member 14 is provided with a restricted passageway 17 communicating with the variable volume chamber and the fluid passageway 4 in the piston head 5. It will be noted that the leaf valve member 14 provides upper and lower fluid chambers which intercommunicate by means of the restricted passageway 17.

The principle of operation of this invention will now be illustrated in the following. As hitherto explained, the magnitude of the damping force of the shock absorber is determined by the amount of opening of the leaf valve 14 and the flow quantity of the oil flowing therethrough.

The amount of the opening of the valve member 14 is dependent upon the difference between the pressure P1 in the upper chamber and the pressure P2 in the lower chamber. If the pressure P2 of the lower compression chamber exerts on the free piston 11 and presses it down overcoming the force of spring 13, the volume of the lower compression chamber is increased. If, by the action of the restricted passageway 17 provided on the leaf valve 14, the flow fluid is lagged in time, the pressure P2 in the compression chamber decreases. As the frequency of accelerating vibration against the shock absorber increases and the frequency period of pressure variation in the upper compression chamber becomes short, the pressure difference (P1—P2) becomes large. Then, the opening amount of the leaf valve becomes large reducing its damping force.

As this invention affords a damping force generating mechanism based on the above operative principle, there can be obtained a shock absorber producing least damping force against high frequency vibration occurring when the vehicle runs on a continuously undulated or rough road by selecting proper flow resistance of the restricted passageway 17 of the leaf valve 14 and the spring constant of the freely movable piston 11.

This invention is, therefore, featured by generating a damping force similar to that of the well known shock absorber under ordinary running operation (when frequency period of pressure difference in the upper pressure chamber is long, the phase lag owing to the orifice 17 does not occur). Further, as the frequency of accelerating vibration increases, the pressure P2 is reduced and the pressure difference P1−P2 becomes large. Accordingly, even under the same velocity of piston, the damping force can be reduced correspondingly as the vibration frequency increases so as to reduce the acceleration of the up-spring weight to minimum.

In this invention, there is produced a freely movable piston 11 mounted between the main valve 16 and the piston nut 7, and a variable volume chamber (lower compression chamber) provided between the freely movable piston 11 and the leaf valve 14 communicating with the fluid chamber on the upper side of the valve 14 over the piston head 4 by the restricted passageway 17 provided on the leaf valve 14, thereby forming a phase lag circuit. The construction is simple and inexpensive to manufacture. Practically it can be applied to a conventional shock absorber without changing the standardized size, so that it is very efficient in practice.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What is claimed is:

1. A shock absorber comprising an elongated housing means containing a fluid, a piston rod mounted in said housing means for movement along the length thereof, a piston head mounted on said piston rod within said housing means, said piston head being disposed in sealing relation with said housing means to provide upper and lower fluid chambers, said piston head having a first fluid passageway communicable with said upper and lower chambers, a check valve mounted on said piston head operable to permit fluid flow through said first fluid passageway when said piston is moving in a first direction, said piston head having a second fluid passageway communicable with said upper and lower chambers, a valve member disposed on said piston head operable to permit fluid flow through said second passageway when said piston head is moving in a direction opposite from said first direction, yieldable means for urging said second mentioned valve member in a closed position, said piston head having a chamber, a movable piston member mounted on said piston rod receivable within said chamber and operable to vary the volume of said chamber, thereby providing a variable volume chamber, means for biasing said piston member into said chamber and said second mentioned valve member having a restricted passageway permitting communication between said second passageway and said variable volume chamber.

2. A shock absorber comprising an elongated cylindrical housing member containing a fluid, a piston rod axially mounted in said housing member for movement along the length thereof, a piston head mounted on said piston rod within said housing member, said piston head being disposed in sealing relation with said housing member to provide upper and lower fluid chambers, said piston head having a first fluid passageway communicable with said upper and lower chambers, a check valve mounted on said piston head operable to permit fluid flow through said first fluid passageway when said piston is moving in a first direction, said piston head having a second fluid passageway communicable with said upper and lower chambers, an annular valve member mounted on said piston head operable to permit fluid flow through said second passageway when said piston head is moving in a direction opposite from said first direction, axially movable means mounted on said piston head engageable with said second mentioned valve member, biasing means interposed between said piston rod and said axially movable means for urging said axially movable means against said second mentioned valve to move the same in a closed position, said piston head having an annular chamber, an annular piston member mounted on said piston rod receivable within said chamber and operable to vary the volume of said chamber, thereby providing a variable volume chamber, means interposed between said annular piston member and said piston rod for urging said annular piston member into said variable volume chamber and said second mentioned valve member having a restricted passageway permitting communication between said second passageway and said variable volume chamber.

References Cited by the Examiner

UNITED STATES PATENTS 2,865,396　12/58　Focht _____ 188—88
2,937,724　 5/60　Schnitzer _____ 188—88

FOREIGN PATENTS 1,037,209　 8/58　Germany.

MILTON BUCHLER, *Primary Examiner.*

EUGENE G. BOTZ, ARTHUR L. LA POINT,
*Examiners.*